US009113004B2

(12) United States Patent
Kowal

(10) Patent No.: US 9,113,004 B2
(45) Date of Patent: Aug. 18, 2015

(54) PRINTER WITH AUTO-CLEANING OPERATION AND METHOD THEREOF

(75) Inventor: Yael Kowal, Givataim (IL)

(73) Assignee: Hewlett-Packard Indigo B.V., Maastricht (NL)

(*) Notice: Subject to any disclaimer, the term of this patent is extended or adjusted under 35 U.S.C. 154(b) by 485 days.

(21) Appl. No.: 13/286,126

(22) Filed: Oct. 31, 2011

(65) Prior Publication Data

US 2013/0107326 A1    May 2, 2013

(51) Int. Cl.
*G06T 5/00*        (2006.01)
*H04N 1/407*       (2006.01)
*H04N 1/409*       (2006.01)
*H04N 1/00*        (2006.01)
*B41J 2/165*       (2006.01)

(52) U.S. Cl.
CPC ......... *H04N 1/00045* (2013.01); *B41J 2/16579* (2013.01); *H04N 1/00015* (2013.01); *H04N 1/00031* (2013.01); *H04N 1/00053* (2013.01); *H04N 1/00055* (2013.01); *H04N 1/00058* (2013.01); *H04N 1/00063* (2013.01); *H04N 1/00082* (2013.01); *B41J 2002/16573* (2013.01); *H04N 2201/0082* (2013.01)

(58) Field of Classification Search
USPC .............................. 358/3.26; 101/483; 347/19
See application file for complete search history.

(56) References Cited

U.S. PATENT DOCUMENTS

| 5,245,925 | A |   | 9/1993 | Switall et al. |
| 5,265,537 | A |   | 11/1993 | Gasparrini et al. |
| 5,964,157 | A | * | 10/1999 | Hummel et al. ............... 101/483 |
| 7,143,694 | B2 | * | 12/2006 | Schuster et al. ............... 101/483 |
| 7,543,815 | B2 |   | 6/2009 | Barazani et al. |
| 2005/0116980 | A1 | * | 6/2005 | Nakahanada et al. .......... 347/19 |

FOREIGN PATENT DOCUMENTS

| CN | 2791095 Y | 6/2006 |
| JP | 2001315313 A | 11/2001 |

* cited by examiner

*Primary Examiner* — Vincent Rudolph
*Assistant Examiner* — Michael Burleson

(57) ABSTRACT

A method for performing auto-cleaning in a printer, which is designed for printing on a substrate, may include periodically printing an auto-cleaner print on the substrate in a predetermined frequency. The method may also include scanning the auto-cleaner print to obtain scanned image data of the auto-cleaner print. The method may further include analyzing the scanned image data to determine extent of presence of artifacts indicative of dirt or ink residue. The method may also include based on the extent of presence of the artifacts modifying the frequency.

20 Claims, 5 Drawing Sheets

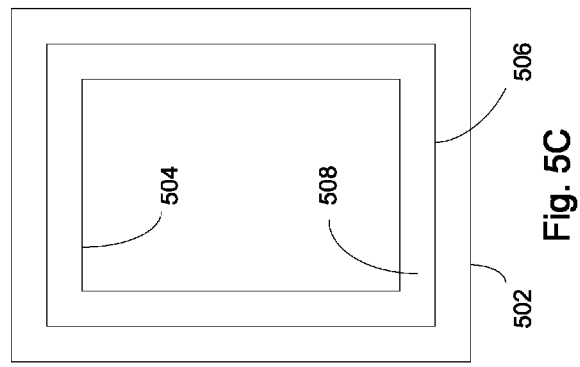
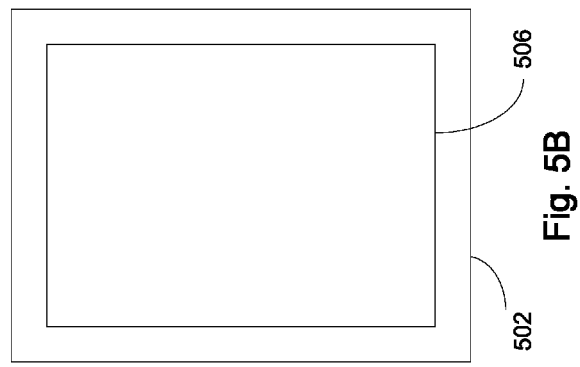
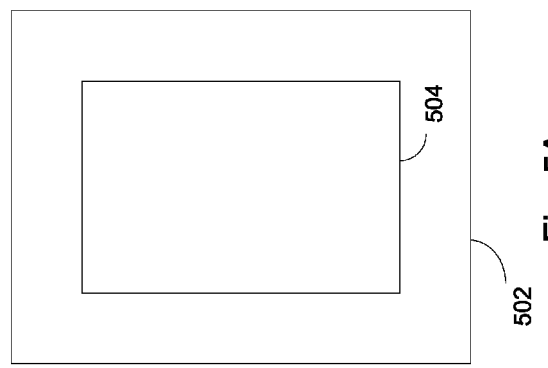

PRINTER WITH AUTO-CLEANING OPERATION AND METHOD THEREOF

BACKGROUND

In the printing industry special attention is drawn to maintaining high quality prints. The quality of prints tends deteriorate as a result of dirt (e.g. dust) or ink residue that accumulate within the printer and affects the quality of prints.

In many printing presses, for example, a cleaner function is typically included, in which a cleaner (e.g. a wiper) wipes out dirt and ink residues from the blanket of the Intermediary Transfer Member (ITM), at a preset or predetermined frequency.

Modern printing machines, such as, for example, HP Indigo 7500 Digital Press, exhibit complete delivery of ink from the blanket onto the substrate. Auto-cleaner capacity in such presses may include printing an auto-cleaner print that includes a single color patch, covering all or most of the print area, thereby making sure that all ink residues are removed from the drum onto the substrate.

Typically, auto-cleaner frequency for such presses is predetermined with respect to substrate group which is currently used for printing. If this frequency is not optimal for a given substrate, the operator may encounter print quality issues, that may consequently lead the operator to replace blankets at a high rate to address the quality issue.

BRIEF DESCRIPTION OF THE DRAWINGS

Examples of the present invention are described in the following detailed description and illustrated in the accompanying drawings in which:

FIG. 5A illustrates a customer-format area on a substrate for printing, in accordance with an example.

FIG. 5B illustrates an auto-cleaner print larger than the customer-format area shown in FIG. 5A.

FIG. 5C shows the margin between the customer-format area of FIG. 5A and the auto-cleaner print of FIG. 5B.

Figure 1:
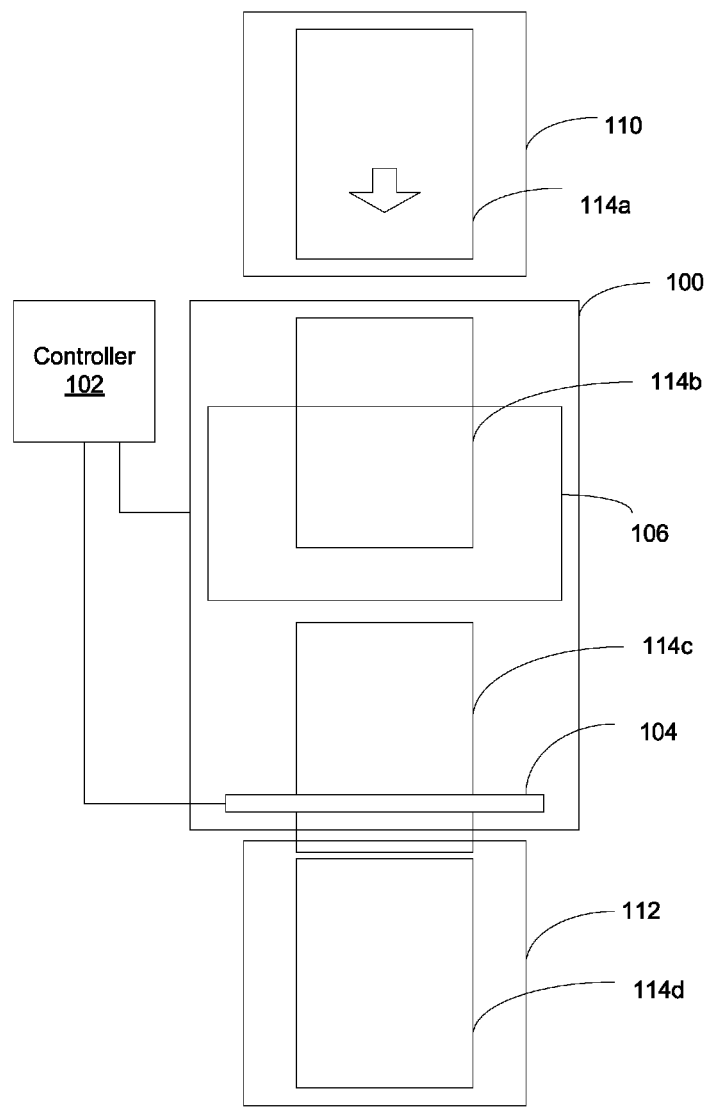
FIG. 1 illustrates a printing press with auto-cleaner operation in accordance with an example.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although examples of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

FIG. 1 illustrates a printing press with auto-cleaner operation in accordance with an example.

Press 100, such as for example, HP Indigo Digital Press (7500 and higher models), is designed to print on substrate sheets which are consecutively introduced into the press and move within press 100 as it is being printed upon by printing element assembly, which may include, for example, blanket 106 (arrows shown in this figure indicate the direction of motion of the web). Feeder 110 may be provided, to feed the sheets into press 100. Shown in this figure are sheet 114a which still lies within feeder 110 and awaits its turn to be fed into press 100, sheet 114b which is currently being printed upon by blanket 106, sheet 114c which is about to emerge from press 100 after it had been printed upon, and sheet 114d which lies in output tray 112.

An in-line scanner (ILS) 104 may be incorporated in the press, positioned at a position facilitating scanning of the printed sheets (all or selected sheets), as each emerges from press 100 (or within press 100 during printing or just after it had been printed upon). In another example, the scanner may be a scanner which is separate from the press.

ILS 104 and press 100 are connected to controller 102. Controller 102 may cause press 100 to periodically perform an auto-cleaner operation by printing an auto-cleaner print. The auto-cleaner print may be scanned by ILS 104 and the scanned image data from ILS 104 may be forwarded to controller 102, where it may be analyzed to determine existence of artifacts indicative of dirt and/or residue ink. For example, when analyzing the scanned image data it may be determined whether the artifacts discovered are above or below a predetermined threshold. This may be accomplished, for example, by measuring an optical characteristic associated with the overall appearance of the auto-cleaner print, across the entire print or a portion thereof, using, for example, an optical sensor. The measured optical characteristic may be, for example, the optical density—OD, the color or the glossiness of the auto-cleaner print or a portion thereof. Hereinafter the measuring of OD is described, but it is understood that other optical characteristics may apply and may, therefore, be measured.

Controller 102 may modify the frequency of the auto-cleaner operation, depending on the analyzed scanned image data of the auto-cleaner print.

For example, if the OD of the discovered artifacts is above a predetermined threshold, the frequency of the auto-cleaner operation may be increased, whereas if the OD of the discovered artifacts is below the predetermined threshold, the frequency of the auto-cleaner operation may be decreased.

An auto-cleaner print, according to an example, is a print which is designed to cause a printer with complete ink delivery capability (i.e., the printed ink is fully or nearly fully transferred onto the substrate in the printing process), to print an image that covers the entire print area and to allow easy spotting of artifacts indicative of dirt or residue ink that accumulate on the printing elements of the printer (e.g. CI drum). Typically an auto-cleaner print may comprise a simple image. For example, an auto-cleaner print may comprise a single color patch covering the entire or most of the print area. Typically a yellow patch may be used (in which case the OD of the artifacts would be measured in the blue channel to increase sensitivity). Other colors may be used too. The color patch may also include more that one color areas (although a single color patch would be suitable for many auto-cleaner purposes). "Color" in the context of the present specification refers to a single shade of any of the color components of the color space or a combination thereof. In some example, more than one shade of color may be used, but it is probably more practical to use a single color shade.

Figure 2:
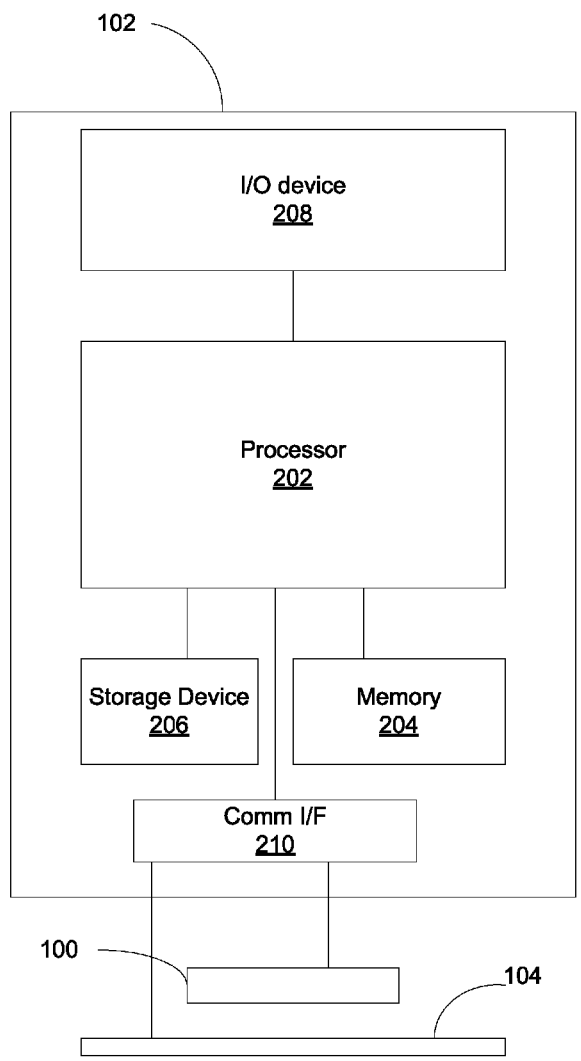
FIG. 2 illustrates a controller for auto-cleaner operation, in accordance with an example.

FIG. 2 illustrates a controller for auto-cleaner operation, in accordance with an example.

Controller 102 may include processor 202, which may be designed to execute program instructions (e.g. an algorithm) for performing auto-cleaner operation in a printer, or manipulate data, in accordance with an example.

Controller 102 may also include an input-output (I/O) device 208, for receiving user input (e.g. user input commands or data), and/or for outputting data, for example, transferring information relating to the auto-cleaner operation to another device, such as, for example, a display device, a front-end or back-end device and in-line or off line devices which form a printing system in which the press is part, etc.

Controller 102 may further include memory, (e.g. primary memory) for direct access by processor 202, which may temporarily or permanently program instructions and data to be directly accessed by processor 202. Controller 102 may also include storage device 206, for example, non-transitory computer readable medium for storing programs and data.

Controller 102 may also include communication interface 210 for interfacing with ILS 104 and press 100.

Figure 3:
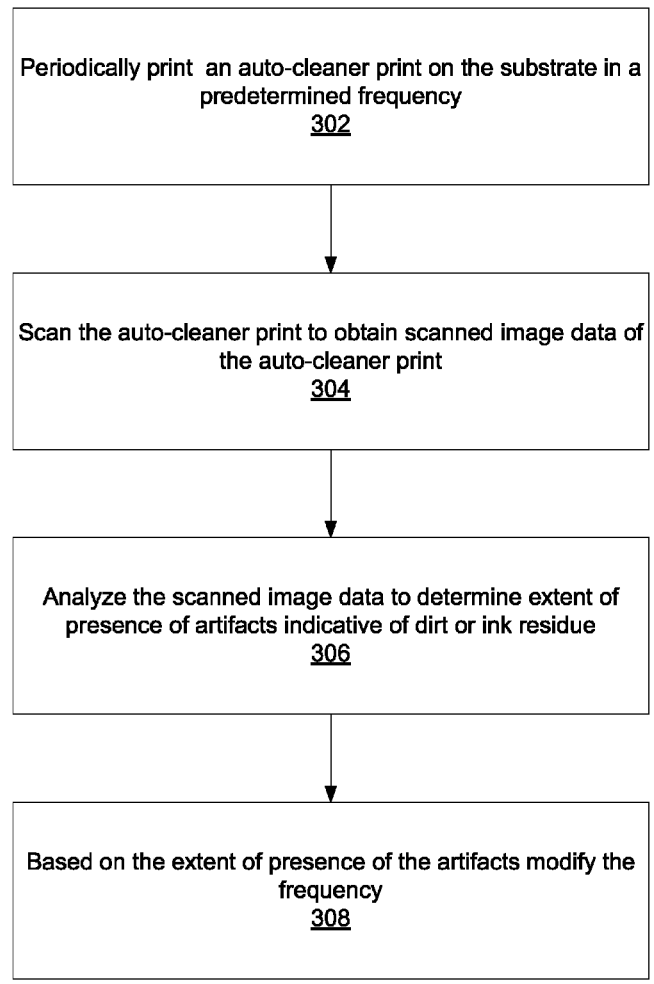
FIG. 3 illustrates a method for performing auto-cleaning in a printer, which is designed for printing on a substrate, in accordance with an example.

FIG. 3 illustrates a method 300 for performing auto-cleaning in a printer, which is designed for printing on a substrate, in accordance with an example.

Method 300 for performing auto-cleaning in a printer, which is designed for printing on a substrate, may include periodically printing 302 an auto-cleaner print on the substrate in a predetermined frequency. Method 300 may also include scanning 304 the auto-cleaner print to obtain scanned image data of the auto-cleaner print. Method 300 may further include analyzing 306 the scanned image data to determine extent of presence of artifacts indicative of dirt or ink residue, and, based on the extent of presence of the artifacts, modifying 208 the frequency.

In accordance to an example, a sequence of images of prints printed by press 100 during normal operation after accomplishing an auto-cleaner operation is saved. In another example, information is accumulated regarding zones of the print area which where occupied by printed objects, in any of the images of the sequence of images of the prints that were printed after the last auto-cleaner print. When a consequent auto-cleaner print is printed only areas on the auto-cleaner print which do not overlap any printed object of any of the images of the sequence, may be scanned to determine extent of presence of artifacts indicative of dirt or ink residue.

In another example, the entire auto-cleaner print is scanned and analyzed.

Figure 4A:
FIG. 4A and FIG. 4B illustrate two images, which were printed in a sequence of prints after a last auto-cleaner operation has been performed, in accordance with an example.
Figure 4B:
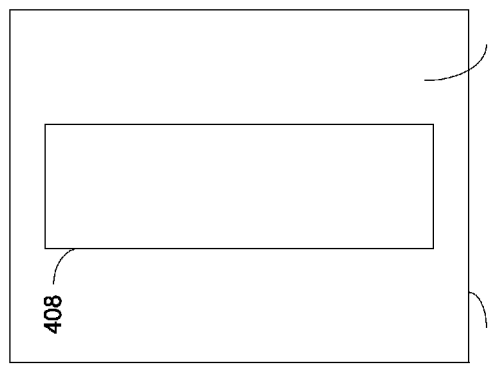

In an example, FIG. 4A and FIG. 4B illustrate two images, 400 and 406, which were printed in a sequence of prints after the last auto-cleaner operation.

Image 400 may include object 402 (flower) surrounded by object-free zone 404, whereas image 406 may include object 408 (rectangle) surrounded by object-free zone 410.

Figure 4C:
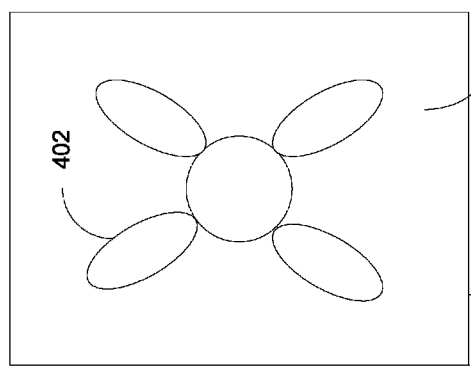
FIG. 4C illustrates an auto-cleaner print, according to an example.

Next a consequent auto-cleaner print 412 (FIG. 4C) may be printed, in the form of a single color patch 414.

Figure 4D:
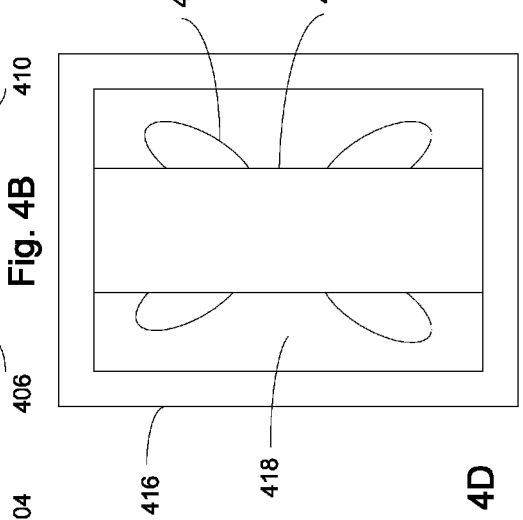
FIG. 4D shows images of FIGS. 4A-4C in an overlapped manner, in accordance with an example.

In accordance with an example, only object-free zones on the auto-cleaner print, which were not occupied by any objects or parts thereof in any of the images of the sequence, may be analyzed to determine the extent of presence of artifacts indicative of dirt or ink residue. This is illustrated in FIG. 4D, which shows images 400, 406 and 414 (FIG. 4A, FIG. 4B and FIG. 4C), in an overlapped manner. It is evident that after disregarding objects 402 and 408 the remaining object-free zone is 418. Therefore, in accordance with an example, only scanned image data pertaining to zone 418 may be analyzed to determine the extent of presence of artifacts indicative of dirt or ink residue.

According to an example, analyzing the scanned image data comprises measuring OD of the scanned print or a zone thereof.

If the OD measured value exceeds a predetermined threshold value the frequency of the auto-cleaner periodic operation may be increased. If the measured OD value is below the threshold, that frequency may be decreased.

In an example, in order to avoid fluctuations and instability in the frequency of the auto-cleaner periodic operations, a range of values of OD measured values (e.g. a first high threshold and a second low threshold) may be predetermined. Thus, if the measured OD value exceeds the first high threshold the frequency may be increased, whereas only if the measured OD is found below the second low threshold, the frequency may be decreased.

In an example, the increase or decrease in the frequency of the auto-cleaner periodic operations may be incremental, e.g. by 10 or 20 (or other predetermined value) percent with respect to the current frequency.

In another example, a zone covering only a predetermined percentage of the object free zone may be analyzed. In this case, OD may be measured only in that zone, thereby saving processing time and power.

In another example, if the in-line scanner is not sensitive enough to detect differences in background accumulation values (OD values) near the threshold values, out-of-customer-format areas may be used for scanning. For example, print margins may be enlarged (e.g. by 1-2 mm) and the margins may be analyzed (e.g. OD measured). In another example, areas which are reserved for calibrations may be scanned and analyzed. These areas are typically outside the regular Auto-Cleaner area. In accordance with an example, every predetermined number of auto-cleaner prints, where the threshold for that auto-cleaner print is the lowest value around which differences in background accumulation are detectable, a larger-format auto-cleaner print may be printed, and the newly-cleaned areas scanned (the ones outside the usual print area). Again, reference may be made to one or more thresholds, in determining whether to increase, decrease or maintain unchanged the frequency of the periodic auto-cleaner operation.

FIG. 5A illustrates a substrate 502 with customer-format area 504 marked on the print. According to an example, an auto-cleaner print 506 (FIG. 5B) may occupy an area of substrate 502, which is larger than the customer-format area 504. FIG. 5C shows customer-format area 504 and auto-cleaner print 506 in an overlapped manner. In accordance with an example, only the margins 508—the area of the auto-cleaner print 506, which does not overlap customer-format area 504—may be analyzed to determine extent of presence of artifacts indicative of dirt or ink residue.

Performing auto-cleaner operation in the manner described hereinabove may optimize the frequency of the periodic auto-cleaner print operation, and avoid, or greatly reduce print quality issues attributed to existing dirt or ink residues.

This may also contribute to paper conservation, when high frequency of auto-cleaner operation which may be determined just by considering the type of substrate currently used for printing is reduced as a result of analyzing scanned imade data of the auto-cleaner print.

Aspects of the invention may be embodied in the form of a system, a method or a computer program product. Similarly, aspects of the invention may be embodied as hardware, software or a combination of both. Aspects of the invention may be embodied as a computer program product saved on one or more non-transitory computer readable medium (or mediums) in the form of computer readable program code embodied thereon. Such non-transitory computer readable medium may include instructions that when executed cause a processor to execute method steps in accordance with examples of the present invention. In some examples of the present invention the instructions stores on the computer readable medium may be in the form of an installed application and in the form of an installation package.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer, or on a plurality of computers.

Aspects of the invention are described hereinabove with reference to flowcharts and/or block diagrams depicting methods, systems and computer program products according to examples of the invention.

What is claimed is:

1. A method for performing auto-cleaning in a printer, which is designed for printing on a substrate, the method comprising:
   periodically printing an auto-cleaner print on substrates at a frequency, wherein the auto-cleaner print comprises a single color patch;
   scanning the auto-cleaner print to obtain scanned image data of the auto-cleaner print;
   analyzing the scanned image data to determine an extent of presence of artifacts indicative of dirt or ink residue; and
   based on the determined extent of presence of the artifacts, modifying the frequency at which the auto-cleaner print is periodically printed on further substrates.

2. The method of claim 1, wherein scanning the auto-cleaner print to obtain the scanned image data of the auto-cleaner print comprises using an inline scanner to perform the scanning.

3. The method of claim 1, wherein analyzing the scanned image data to determine the extent of presence of artifacts indicative of dirt or ink residue comprises measuring an optical characteristic of the auto-cleaner print, selected from the group of characteristics consisting of optical density color and glossiness.

4. The method of claim 3, wherein measuring the optical characteristic is performed only in a zone of the auto-cleaner print which does not overlap with printed objects of a sequence of previously printed images.

5. The method of claim 1, wherein analyzing the scanned image data comprises measuring an optical density of the auto-cleaner print, and in response to the measured optical density exceeding a predetermined threshold, the modifying of the frequency comprises increasing the frequency, and in response to the measured optical density being below the predetermined threshold, the modifying of the frequency comprises decreasing the frequency.

6. The method of claim 5, wherein decreasing or increasing the frequency is performed incrementally.

7. The method of claim 5, wherein the predetermined threshold comprises a range of values.

8. The method of claim 1, wherein the auto-cleaner print is larger than a customer-format area leaving a margin beyond the customer format area, and wherein analyzing the scanned image data to determine the extent of presence of artifacts indicative of dirt or ink residue comprises analyzing scanned image data of the margin.

9. The method of claim 1, wherein the printer comprises a blanket to print onto the substrates and the further substrates.

10. A non-transitory computer readable medium storing instructions that when executed by a system including a processor cause the system to:
    cause periodic printing, by a printer, of an auto-cleaner print on substrate sheets at a frequency, wherein the auto-cleaner print comprises a single color patch;
    receive a scanned image of the auto-cleaner print printed on a first substrate sheet of the substrate sheets;
    analyze the scanned image to determine an extent of presence of artifacts indicative of dirt or ink residue; and
    based on the determined extent of presence of the artifacts, modify the frequency at which the auto-cleaner print is periodically printed onto further substrate sheets.

11. The non-transitory computer readable medium of claim 10, wherein analyzing the scanned image to determine the extent of presence of artifacts indicative of dirt or ink residue comprises measuring an optical density of the auto-cleaner print.

12. The non-transitory computer readable medium of claim 11, wherein measuring the optical density is performed only in a zone of the auto-cleaner print which does not overlap with printed objects of a sequence of previously printed images.

13. The non-transitory computer readable medium of claim 10, wherein analyzing the scanned image comprises measuring an optical characteristic of the auto-cleaner print, selected from the group of characteristics consisting of optical density color and glossiness,
    wherein in response to the measured optical characteristic exceeding a predetermined threshold, the modifying of the frequency comprises increasing the frequency, and in response to the measured optical characteristic being below the predetermined threshold, the modifying of the frequency comprises decreasing the frequency.

14. The non-transitory computer readable medium of claim 13, wherein decreasing or increasing the frequency is performed incrementally.

15. The non-transitory computer readable medium of claim 13, wherein the predetermined threshold comprises a range of values.

16. The non-transitory computer readable medium of claim 10, wherein the auto-cleaner print is larger than a customer-format area leaving a margin beyond the customer format area, and wherein analyzing the scanned image to determine the extent of presence of artifacts indicative of dirt or ink residue comprises analyzing scanned image data of the margin.

17. A printer comprising:
a printing element assembly;
a controller to cause the printing element assembly to periodically print an auto-cleaner print on substrates at a frequency, wherein the auto-cleaner print comprises a single color patch;
a scanner to scan the auto-cleaner print printed on a first substrate of the substrates so as to obtain scanned image data of the auto-cleaner print; and
a processor to analyze the scanned image data to determine an extent of presence of artifacts indicative of dirt or ink residue, and based on the determined extent of presence of the artifacts, modify the frequency at which the auto-cleaner print is printed on further substrates.

18. The printer of claim 17, comprising a press, wherein the printing element assembly includes a blanket on an intermediary transfer member, the blanket to print the auto-cleaner print onto a substrate.

19. The printer of claim 17, wherein the scanner is an inline scanner.

20. The printer of claim 17, wherein the single-color patch is to remove artifacts from a drum of the printer.

* * * * *